Nov. 28, 1950  J. F. SCHROEDER  2,532,122
TRIPOD HEAD
Filed Jan. 24, 1947
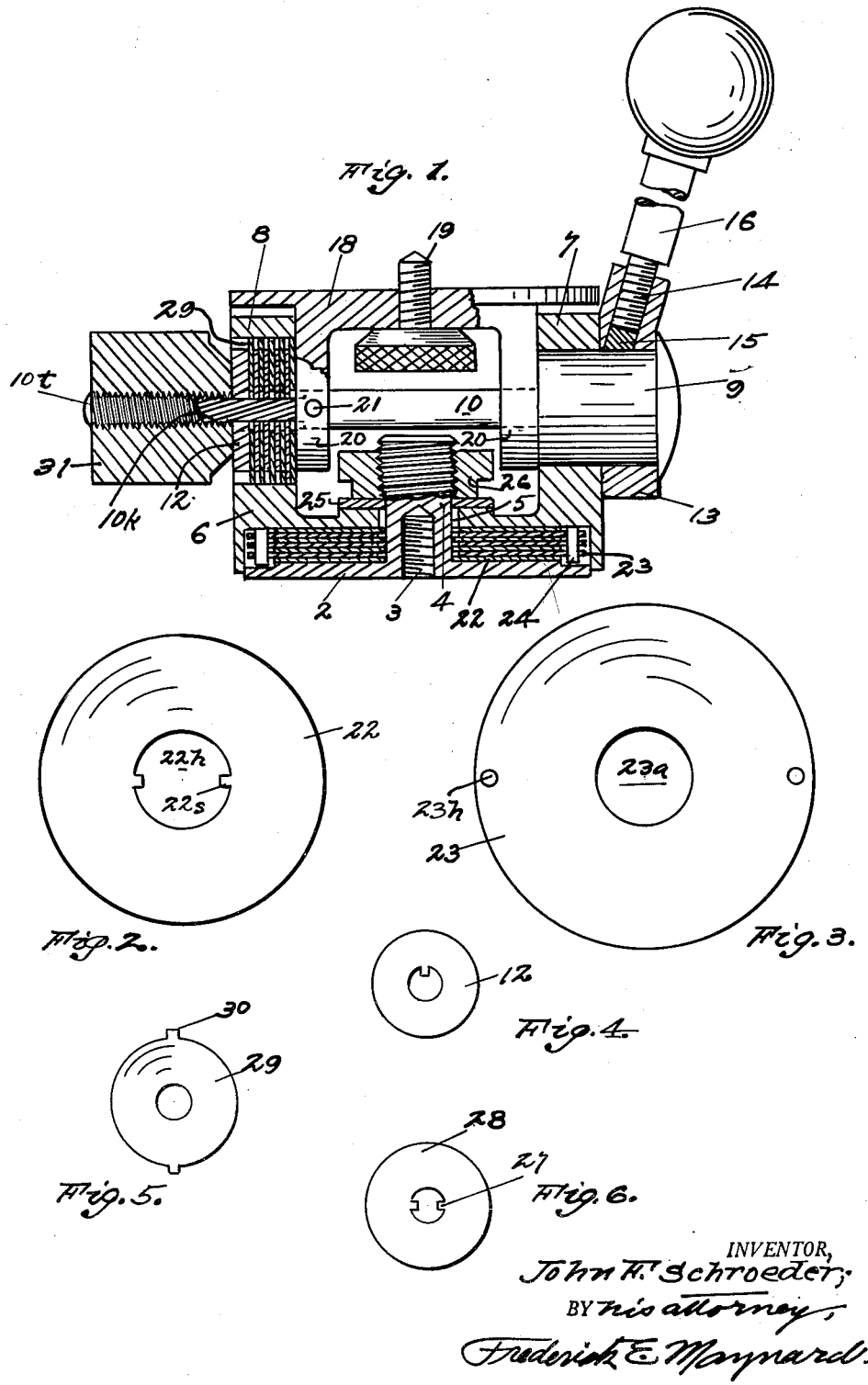
INVENTOR,
John F. Schroeder,
BY his attorney,
Frederick E. Maynard.

Patented Nov. 28, 1950

2,532,122

UNITED STATES PATENT OFFICE 2,532,122

TRIPOD HEAD

John F. Schroeder, Los Angeles, Calif.

Application January 24, 1947, Serial No. 724,049

2 Claims. (Cl. 248—183)

This invention is a tripod head for cameras of the panoramic type, but not limited to such instruments.

It is an object of this invention to provide a tripod head which may be effectively attached to the conventional top table of tripods, of cameras or other instruments and which includes a readily rotative block on which is tiltably mounted a camera bed and to provide means which will permit of the relative movement of the block as to the table, and of the bed as to the block in a facile and smooth manner all without any lost motion of the operative parts and therefore eliminating the hazard of highly objectionable vibrations of the mounted camera.

A further purpose of the invention is to provide a bed turning and tilting crank which may readily be re-adjusted in its angular position relative to the head as may be deemed most convenient to individual operators of the camera when mounted on this head.

The invention further purposes to incorporate highly efficient frictional means as between the said block and a trunnion about which it turns as to the tripod, and as between the block and the camera bed, and to provide for the ready adjustment of the friction means to suit the immediate needs of the individual operator.

And the invention noticeably provides a structural assembly wholly free from complex, delicate and costly mechanical parts, and one that is compact, rugged and unobjectionable weight, and whose parts can be replaced quickly at low cost of time and material expense.

The invention resides in certain advancements in this art as set forth in the ensuing disclosure and having, with the above, additional objects and advantages as hereinafter developed, and whose constructions, combinations, and details of means and the manner of operation will be made manifest in the following description of the herewith illustrative embodiment; it being understood that modifications, variations and adaptations may be resorted to within the scope, spirit and principles of the invention as it is claimed in conclusion hereof.

Figure 1 is an axial, vertical section of the head.

Figure 2 is a plan of trunnion locked friction disc, and

Figure 3 is a like view of a relative co-operative block-locked friction disc.

Figure 4 is a plan of a spindle fitted washer.

Figures 5 and 6 are plans of co-operative, spindle controlling friction discs.

As here embodied the head includes a flat table plate 2 having a central screw hole 3 for tight reception of a complementary screw, not shown, of a conventional cap of a tripod leg system. This plate has a central screw post 4 on its top face and which has longitudinal, external keyways 5.

Snugly swivelled on this post 4 is a discal block 6 having at opposite sides upstanding ears 7 and 8; the bottom of the block being recessed to slightly telescope over the rim of the plate 2.

Turnably journalled in the ear 7 is the enlarged hub 9 of a transverse spindle 10 having nonturnable on its opposite end a bearing washer 12 housed and fitted in the ear 8 and keyed to said spindle. For the purpose of rotating the spindle on its axis a collar 13 is snugly fitted on the head or hub 9 and has an oblique, radial, threaded hole 14 in the bottom of which is a friction shoe 15 of desired material which is adjustably compressible by a hand lever 16 screwing into the hole 14. This handle device has the great advantage of being both effective in its hold on the spindle hub and is readily adjustable to any desired position around the hub as the cameraman may wish.

For attaching a camera to this head there is provided a discal bed 18 of about the diameter of the block 6 and having a central upwardly projecting clamp screw 19 to receive the camera box. Extending down from the bottom of the bed 18 is a pair of diametrically opposite coaxial lugs 20 snugly but tiltably fitting between the ears 7 and 8 and being rigidly secured to the spindle 10 as by a dowel pin 21 whereby the bed may be readily tilted as to the body block 6 by swinging the hand lever 16 on the axis of the spindle.

It is of importance in heads of this class that the relatively movable main elements, as the block and the bed, be of ready operation instantly and at the same time be of smooth motion free from jerks and from objectionable looseness and vibration. Therefore, an efficient and simple friction device is interposed between the block 6 and the table plate 2 and here includes a stack of friction shims 22, Fig. 2, and 23, Fig. 3; the former having a center hole 22h to fit the post 4 and having spurs 22s to interlock in the keyways 5 thereof. The shim 23 is larger than the shim 22 and has marginally located holes 23h to take respective locking pins 24 fixed in the bottom of the block, and has a central hole 23a to rotatively receive the post. Disposed on the top face of the block and about the post 4 is a substantial washer 25 interlocking in the keyways of the post, and on the washer rests a rotative pressure regulating finger nut 26 threaded on the post and operative to compress the stack of shims 22 and 23, which are alternated in suitable number on the plate 2.

Means are also provided to frictionally control relative tilting motion of the bed 18 as to the block 6, and as here shown the spindle has a threaded end 10t with keyways 10k receiving keys 27 of a friction shim 28, Fig. 6, of which a suitable number is mounted on the spindle and rotate therewith. Complementary with the shims 28 are alternately interposed shims 29 having rim spurs 30 for interlocking with the spindle receiving ear 8. Mounted on the stem and outwardly of the washer 12 is a finger nut 31 adjustable on the threads to suitably regulate the compression of the controlling, friction device 27—29.

The operation of the head is thought to be obvious from the above detail description.

It is understood that the word camera as used herein includes motion-picture types; as these commonly have a panoramic sweep and tilting capacity.

What is claimed is:

1. A tripod head comprising a table plate having a central, bottom hole threaded to receive a tripod cap screw and having on its top a post coaxial with said hole and whose upper part is externally threaded, a block swivelled on said post to turn therearound and having diametrically opposite bearing ears outwardly from said post, mutual friction discs centered on said post and some of which are keyed to the post and some to the block in alternate assembly and being countersunk in the bottom of said block and bedded on said table, a camera bed having a pair of lugs fitting between said ears, a spindle fixed in said lugs and journalled in said ears and extending above and across the axis of the post and rockably connecting said bed to the block, a finger-operative nut threaded on the post and readily accessible just below the said spindle and clamping said block whereby said block is forced down on the uppermost of said discs to regulate their frictional resistance to rotation of the block about the post, manually set friction means in one of said ears and on one end of the spindle to regulate tilting friction of the bed, and a manipulating handle fixed on the opposite end of the spindle; said table having a coaxial camera connecting, finger screw arranged just above said spindle.

2. The head of claim 1; said handle having a threaded inner end, a collar turnable on the spindle and into which the handle screws, and a binding friction shoe compressed by the handle onto the spindle to fasten the handle at any desired position around the spindle.

JOHN F. SCHROEDER.

REFERENCES CITED

The following references are of record in the file of this patent:

UNITED STATES PATENTS

| Number | Name | Date |
|---|---|---|
| 1,898,469 | Tonsor | Feb. 21, 1933 |
| 1,948,055 | Thalhammer | Feb. 20, 1934 |
| 2,047,241 | Wittel | July 14, 1936 |
| 2,111,012 | Tondreau | Mar. 15, 1938 |
| 2,318,910 | Zucker | May 11, 1943 |